United States Patent [19]
Gordon

[11] Patent Number: 5,234,229
[45] Date of Patent: Aug. 10, 1993

[54] PRESSURE LIMITED RESTRAINT SYSTEM

[75] Inventor: John E. Gordon, Vandalia, Ohio

[73] Assignee: General Motors Corporation, Detroit, Mich.

[21] Appl. No.: 874,160

[22] Filed: Apr. 27, 1992

Related U.S. Application Data

[63] Continuation-in-part of Ser. No. 841,998, Feb. 25, 1992, abandoned.

[51] Int. Cl.$^5$ .............................................. B60R 21/26
[52] U.S. Cl. ................................. 280/736; 280/742; 222/3
[58] Field of Search ............... 280/736, 741, 742, 731, 280/737, 739; 222/3

[56] References Cited

U.S. PATENT DOCUMENTS

| | | | |
|---|---|---|---|
| 3,747,953 | 7/1973 | Goes et al. | 280/739 |
| 3,758,133 | 9/1973 | Okada | 280/739 |
| 3,887,215 | 6/1975 | Albrecht et al. | 280/742 |
| 3,910,595 | 10/1973 | Katter et al. | 280/738 |
| 4,394,033 | 7/1983 | Goetz et al. | 280/736 |
| 4,964,652 | 10/1990 | Karlow | 280/730 |
| 4,989,895 | 2/1991 | Pearson et al. | 280/739 |
| 5,054,811 | 10/1991 | Unterforsthuber | 280/742 |

FOREIGN PATENT DOCUMENTS 1-229739  9/1989  Japan ................. 280/736

*Primary Examiner*—Karin L. Tyson
*Attorney, Agent, or Firm*—Charles E. Leahy

[57] ABSTRACT

An occupant restraint system comprises an inflatable air bag having an open end which is closed by one side of a base plate having a central circular opening flanked by a plurality of circumferentially-spaced mounting holes. An inflator for the air bag has a cylindrical casing with radial fluid discharge ports for discharging gas. A flange extends radially beyond the casing below the discharge ports and includes four circumferentially-spaced mounting holes which mate with the base plate mounting holes. The inflator acts as a valve to maintain air bag pressure below a predetermined level. This is accomplished by providing guide pins extending through the mated mounting holes. The guide pins carry compression springs which bias the inflator to a first position in which the flange engages the base plate with the discharge ports located above the base plate in operative communication with the air bag. The inflator includes a reaction surface located above the discharge ports which is exposed to air bag pressure. When the force exerted by air bag pressure exceeds a predetermined level, the springs compress and the inflator slides on the pins to a second position in which the discharge ports are located below the base plate out of operative communication with the air bag. Alternatively, the inflator may be supported by a plastically yieldable support which collapses to allow movement of the inflator to the second position.

11 Claims, 3 Drawing Sheets

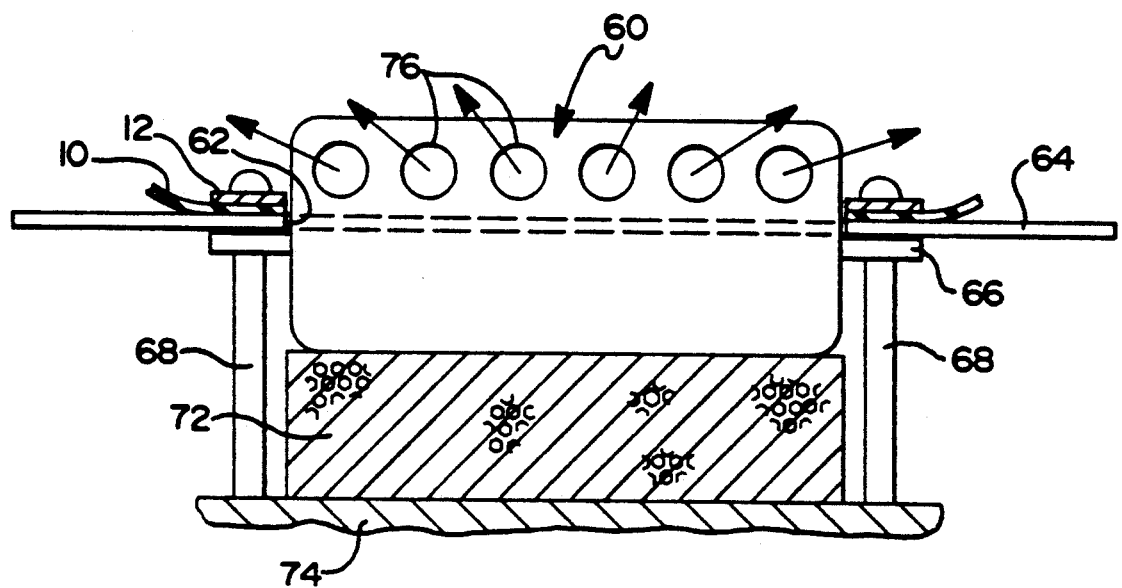
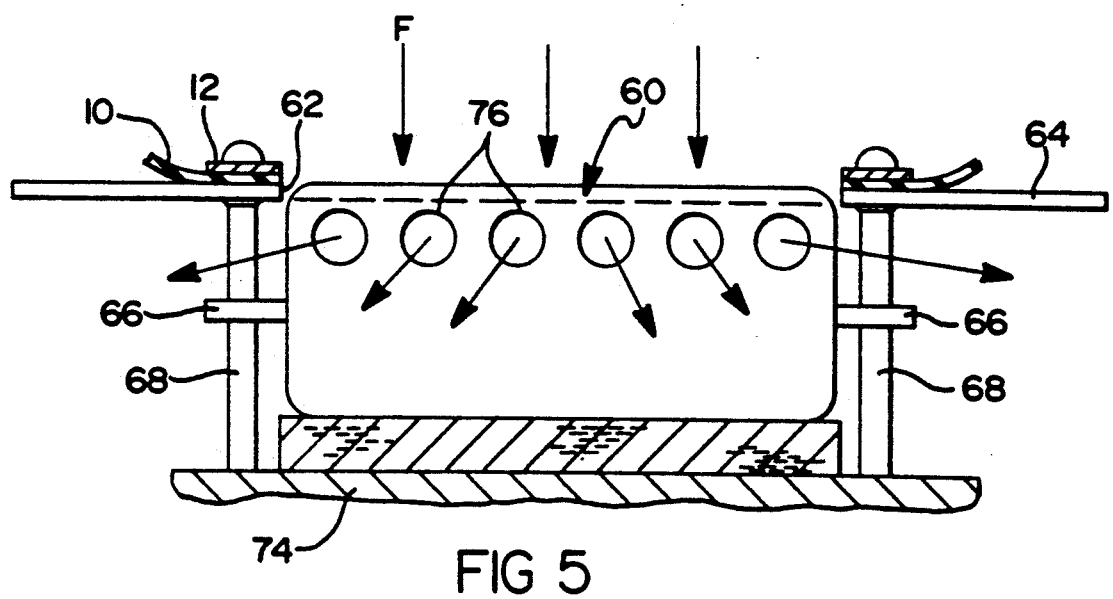

5,234,229

PRESSURE LIMITED RESTRAINT SYSTEM

CROSS REFERENCES TO RELATED APPLICATION

This invention is a continuation-in-part of Ser. No. 07/841,998 filed Feb. 25, 1992, now abandoned.

FIELD OF THE INVENTION

This invention relates generally to passenger vehicle occupant restraint systems and, more particularly, to such a system which employs an inflatable air bag that is pressure limited.

BACKGROUND OF THE INVENTION

It has been found desirable to limit the pressure within an inflating, deploying air bag to a predetermined maximum. Conventional means for limiting this pressure comprise the use of openings or vents in the air bag itself. In one such arrangement these vents are open during the entire air bag deployment. By venting the air bag to ambient atmosphere, the pressure within the air bag may be maintained at or below this predetermined level.

In another arrangement these vents are activated only upon the air bag pressure reaching a predetermined level. One such arrangement for limiting air bag pressure is disclosed in U.S. Pat. No. 4,989,895 - Pearson et al which utilizes force actuated venting of the air bag when air bag pressure reaches a predetermined maximum level. In this arrangement, air bag venting occurs when the reaction force on the inflator and its mounting support generated by the internal air bag pressure, resulting from engagement with the occupant of the air bag, exceeds the predetermined pressure level. The air bag support includes vents that are closed by rupturable diaphragms mounted above rupture pins. Collapsible columns mount the support and inflator and maintain the diaphragms above the pins. When a reaction force exceeds a predetermined level, the supports collapse, carrying the support and inflator with it so that the pins rupture the diaphragms to vent the air bag to ambient. With this arrangement, no venting will occur unless the predetermined pressure is reached. However, this improvement is gained through use of a physical arrangement requiring a plurality of collapsible columns, rupturable diaphragms and piercing pins. Also the process is a "one shot" action which is irreversible.

It would be desirable to provide a pressure limiting device for an air bag which is activated only upon air bag pressure reaching a predetermined level, but which is simple in concept and construction.

SUMMARY OF THE INVENTION

It is an object of this invention to provide a pressure limiting device for an air bag which is activated only upon air bag pressure reaching a predetermined level, but which is simple in concept and construction.

Accordingly, this invention features a pressure limiter for an occupant restraint system which comprises an inflatable air bag having an open end, an inflator for inflating the air bag with pressure fluid from fluid discharge ports through said open end, and a baseplate for mounting the inflator and closing the air bag open end. The pressure limiter operatively connects the inflator discharge ports with the air bag whenever air bag pressure is below a predetermined level and disconnects the discharge ports from the air bag when said predetermined pressure level is exceeded.

In one aspect, this invention features a valve movable between positions connecting and disconnecting the discharge ports with the air bag, including resilient means biasing the valve means to a position operatively connecting the discharge ports with the air bag.

In another aspect, this invention features a valve which comprises a central aperture in the baseplate, the inflator itself, and means mounting the inflator for movement through the aperture. A yieldable means biases the inflator through the base plate aperture to the position connecting the discharge ports with the air bag, while the inflator is responsive to pressure to overcome the yieldable means and move to a position operatively disconnecting the discharge ports from the air bag when air bag pressure reaches the predetermined level. The yieldable means may be a compression spring which yieldably urges the inflator through the base plate aperture and resiliently yields, or the yieldable means may be a collapsible support which normally supports the inflator through the base plate aperture and then is plastically deformed in response to the bag pressure.

In yet another aspect, this invention features a plurality of guide pins mounted on the base plate which project through a plurality of mounting holes located on an inflator flange and compression springs which are retained on the pins to bias the inflator into engagement with the base plate, with discharge ports above the base plate operatively connected with the air bag. The inflator is responsive to a force exerted on it by a predetermined air bag pressure to compress the springs and slide on the guide pins away from the base plate to move the discharge ports below the base plate, operatively disconnected from the air bag, thus limiting its pressure.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 4 is an enlarged elevation of the second embodiment of the air bag pressure limiter, illustrated in its air bag inflating position; and FIG. 5 is a view similar to FIG. 4 with the pressure limiting device illustrated in its pressure limiting position.

DETAILED DESCRIPTION OF A PREFERRED EMBODIMENT

Figure 1:
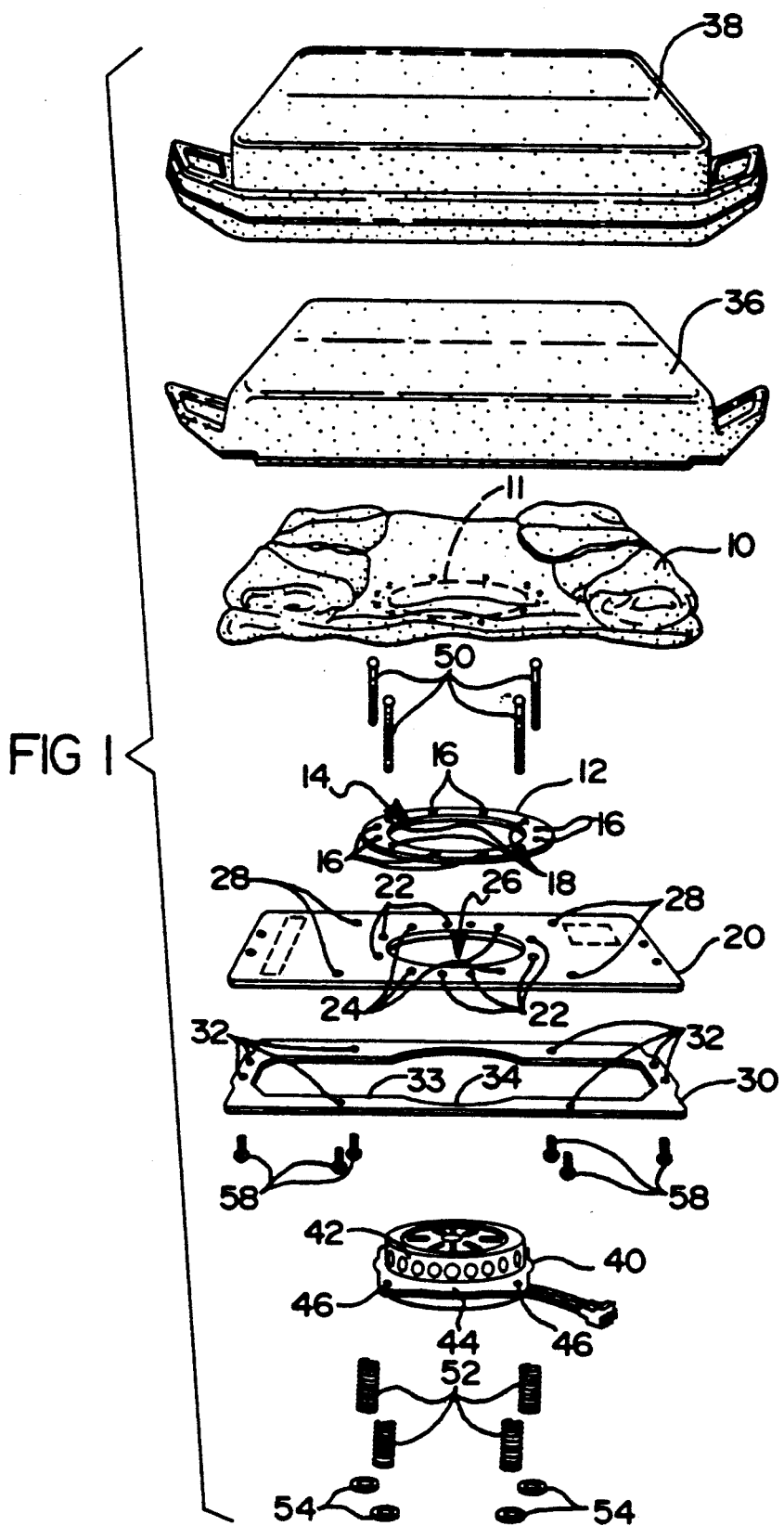
FIG. 1 is an exploded perspective view of an inflatable restraint system including an air bag and a pressure limiter therefor, according to this invention, illustrating its component parts.

Referring now to the drawings, FIG. 1 illustrates a driver side inflatable air bag restraint system for a passenger vehicle of the type more fully disclosed in U.S. Pat. No. 4,989,895 - Pearson et al, assigned to the assignee herein, the disclosure of which is incorporated by reference. As is well-known, this type of restraint system is mounted in the hub of a steering wheel for deployment of the air bag upon detection of a threshold vehicle deceleration.

The restraint system includes an inflatable air bag 10, having a circular opening 11 in its inner end, and a circular air bag retainer ring 12, having a circular central opening 14 flanked by a plurality of circumferentially-spaced mounting holes 16 and 18. A base plate 20 includes spaced mating mounting holes 22 and 24, which flank a circular central opening 26, and other spaced apertures 28.

A pad retainer 30 includes apertures 32, which mate with apertures 28, spaced around a generally rectangular opening 33 having a circular central portion 34. A rectangular container 36 and its cover 38 are provided for covering the installed air bag, as illustrated in the Pearson et al patent.

An inflator 40 is provided for inflating air bag 10. It has a stepped cylindrical casing including an upper cylindrical portion 42, having a plurality of radial inflating gas discharge ports 43. A peripheral mounting flange 44 having four mounting holes 46 extends from the casing at the end of cylindrical portion 42.

The restraint system is assembled by inserting retainer ring 12 within air bag opening 11, which is flanked by holes provided to mate with mounting holes 16 and 18 of retainer ring 12. Base plate mounting holes 22 and 24 are aligned and rivets (not shown) are inserted through mating holes 16 and 22 and the matching air bag holes to mount the air bag 10 to the base plate 20. This mounting arrangement is conventional.

Four elongated guide pins 50 are provided and are inserted through ring holes 18, the mating air bag holes, base plate holes 24, and inflator flange holes 46. Compression springs 52 are inserted over the ends of pins 50 and are retained there by fasteners 54 which are threadedly or otherwise secured to the ends of pins 50. Bolts 58 are inserted through pad retainer holes 32 and base plate holes 28 into engagement with retaining means in container 36 (not shown) to secure the container to the assembly.

Figure 2:
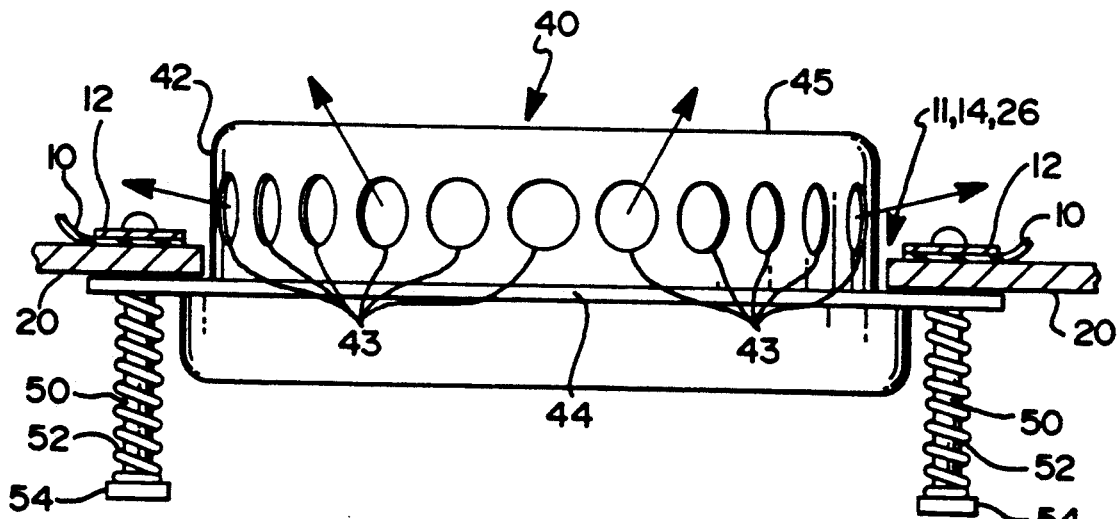
FIG. 2 is an enlarged elevation of the air bag pressure limiter, according to this invention, illustrated in its air bag inflating position.
Figure 3:
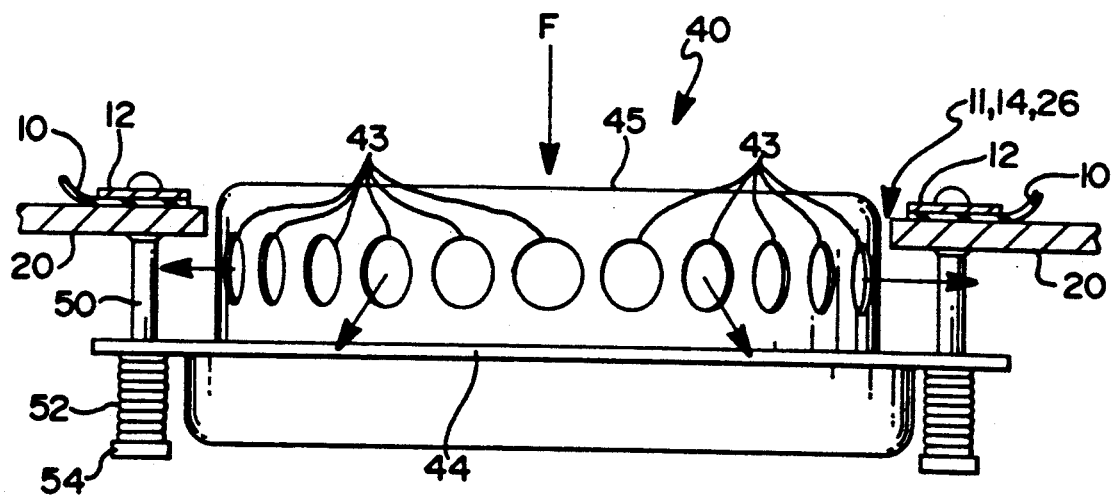
FIG. 3 is a view similar to FIG. 2, with the pressure limiting device illustrated in its pressure limiting position.

The mating central circular openings 11, 14 and 26 all are sized to slidably receive inflator cylindrical portion 42, as shown in FIGS. 2 and 3. The opening 32, 34 of pad retainer 30 is large enough to clear inflator flange 44.

The means for limiting pressure in air bag 10 will now be described with additional reference to FIGS. 2 and 3. In the restraint system, as installed, springs 52 exert an upward force which maintains inflator flange 44 in contact with the underside of base plate 20, effectively closing the open end of the air bag. In this position, discharge ports 43 are located above base plate 20 and within opening 11, operatively connected to the interior of air bag 10.

Upon actuation, inflator 40 will generate pressure fluid in the form of a gas which will discharge through ports 43, as indicated by arrows, to inflate air bag 10. As is conventional, the inflating air bag will burst through preformed doors in container 26 and pad 38 in a well-known manner to deploy to its designed restraint position.

As indicated in FIG. 3, fluid pressure in air bag 10 exerts a force F on the top 45 of inflator 40 which serves as a reaction surface Should pressure within air bag 10 exceed a predetermined level, force F will overpower the upward biasing force exerted on inflator 40 by compression springs 52. As a result, inflator will slide downwardly on pins 50, from the FIG. 2 position to the FIG. 3 position.

In this position, discharge ports 43 lie below base plate 20 and out of operative connection with the interior of air bag 10. The pressurized gas discharged through ports 43 will be vented to ambient. This effectively limits the pressure in air bag 10 to the predetermined level.

The reaction force on inflator 40 is generated by the pressure within air bag 10 and directly measures the force applied to the air bag by the occupant. During most air bag deployments, air bag pressure will not be sufficiently large to exceed the predetermined force F and cause movement of inflator discharge ports 43 below base plate 20. This force F can be set to any predetermined level, such as 2 kN.

With this construction, inflator 40 and base plate 20 act as a relief valve, with springs 52 determining the pressure setting of this "relief valve". This simple arrangement requires only a slight modification to conventional inflator mountings, in which the inflator is bolted or riveted immovably to the base plate, involving only the replacement of four rivets or bolts with pins and springs. In addition the use of springs enables a throttling valving action, unlike the "one shot" arrangement in Pearson.

FIGS. 4 and 5 show a second embodiment of the invention in which an inflator 60 similar to that of FIGS. 1-3 is mounted within a circular central opening 62 of a base plate 64. The inflator 60 has a peripheral mounting flange 66 having holes therein for receiving a plurality of elongated guide pins 68 which slidably mount the inflator 60 for vertical up and down movement as viewed in FIGS. 4 and 5.

As best seen in FIG. 4, a block of plastically yieldable support 72 is located between the underside of inflator 60 and a support plate 74 attached to guide pins 68 to support the inflator 60 at its elevated position of FIG. 4 in which the peripheral flange 66 engages the base plate 64. In this position, the discharge ports 76 of the inflator 60 are located above the base plate 64 and are thereby operatively connected to the interior of the air bag.

Upon actuation, inflator 60 will generate pressure fluid in the form of a gas which will discharge through the ports 76, as indicated by arrows, to inflate the air bag. As indicated in FIG. 5, fluid pressure in the air bag exerts a force F on the inflator 60 which urges downward movement of the inflator 60. Should the pressure within the air bag exceed a predetermined level, force F will overpower the plastically yieldable support 72. As a result, the plastically yieldable support 72 will collapse, and as a result, the inflator 60 will slide downwardly on the pins 68 from the FIG. 4 position to the FIG. 5 position.

In this position of FIG. 5, the discharge port 76 lies below the base plate 64 and out of operative connection with the interior of the air bag. The pressurized gas discharged through the ports 76 will be vented to ambient. This effectively limits the pressure in the air bag to the predetermined level. The plastic collapse of the plastically yieldable support 72 assures that the inflator 60 will remain in the downward pressure relieving position of FIG. 5. Upon replacement of the inflator 60, the plastically yieldable support 72 will also be replaced.

A suitable example of the plastically yieldable support 72 is aluminum hexagonal honeycomb availabe from Hexcel Corporation, 2 Stony Hill, Bethel, Conn.

06801. However, it will be understood that other plastically yieldable support structures may be employed.

While only two embodiments have been illustrated and described, obvious modifications thereof are contemplated within the scope of this invention and the following claims.

I claim:

1. In an occupant restraint system comprising an inflatable air bag having an open end, an inflator for inflating the air bag with pressure fluid from fluid discharge ports through said open end, and a baseplate for mounting the inflator and closing the air bag open end, pressure limiting means for operatively connecting the inflator discharge ports with the air bag whenever air bag pressure is below a predetermined level and for disconnecting the discharge ports from the air bag when said predetermined pressure level is exceeded, said pressure limiting means comprising a central aperture in the baseplate, the inflator itself, and mounting means mounting the inflator for movement relative to said aperture, the yieldable means biasing the inflator through said central aperture to a first position operatively connecting the inflator discharge ports with the air bag, the inflator being responsive to pressure to oppose said yieldable means and move to a second position disconnecting the discharge ports from the air bag through said central aperture when air bag pressure has reached said predetermined level.

2. The pressure limiting means of claim 1, wherein the mounting means mount the inflator to the baseplate for sliding movement through the central aperture to move the discharge ports between positions, and wherein the yieldable means comprise springs biasing the inflator to first position.

3. The pressure limiting means of claim 1, wherein the mounting means mount the inflator to the base plate for sliding movement through the central aperture to move the discharge ports between positions, and wherein the yieldable means comprises a plastically yieldable support structure which normally positions the inflator in the first position and plastically yields to permit movement of the inflator to the second position.

4. The pressure limiting means of claim 1, wherein the mounting means comprise a plurality of guide pins mounted on the base plate upon which the inflator is slidable between positions.

5. The pressure limiting means of claim 4, wherein the guide pins additionally mount the air bag on the base plate.

6. In an occupant restraint system comprising an inflatable air bag having an open end, an inflator for inflating the air bag with pressure fluid from fluid discharge ports through said open end, and a base plate closing the air bag open end and having a central opening for receiving the inflator, the improvement comprising mounting means mounting the inflator for movement through said opening between a first position with the discharge ports in operative communication with the air bag and a second position with the discharge ports out of operative communication with the air bag.

7. The improvement of claim 6, including yieldable means biasing the inflator to first position when air bag pressure is below a predetermined level.

8. The improvement of claim 7, wherein the mounting means comprise a mounting flange on the inflator, a plurality of mounting holes on the base plate and a plurality of pins mounted on the base plate and projecting through the mounting holes, and the yieldable means comprise a compression spring retained on each pin and engaging the mounting flange to bias the inflator to first position in engagement with the base plate.

9. The improvement of claim 7 wherein the mounting means comprise a mounting flange on the inflator, a plurality of mounting holes on the base plate and a plurality of pins mounted on the base plate and projecting through the mounting holes, and the yieldable means comprise a plastically yieldable support structure underlying the inflator to normally support the inflator in the first position and being plastically yieldable upon movement of the inflator to the second position.

10. An occupant restraint system comprising an inflatable air bag having an open end,
   a base plate having one side mounting the air bag to close the air bag open end and having a central circular opening flanked by a plurality of circumferentially-spaced guide pins extending from the other side,
   an inflator for inflating the air bag and having a cylindrical casing with radial fluid discharge ports for discharging pressure fluid, a flange extending radially beyond the casing below the discharge ports and having a plurality of circumferentially-spaced mounting holes slidably receiving the guide pins, the inflator being slidable through said opening between a first position, in which the flange engages the base plate with the discharge ports located above the base plate in operative communication with the air bag, and a second position, in which the flange disengages the base plate with the discharge ports located below the base plate out of operative communication with the air bag, and
   compression springs carried by the guide pins and engaging the flange to bias the inflator to first position.

11. The occupant restraint system of claim 10, wherein the inflator includes a reaction surface located above the discharge ports and exposed to air bag pressure, and responsive to the force exerted by air bag pressure above a predetermined level to compress the springs and move the inflator to second position.

* * * * *